No. 727,045. PATENTED MAY 5, 1903.
O. WHITMORE.
BRAKE FITTING.
APPLICATION FILED AUG. 27, 1900. RENEWED SEPT. 8, 1902.
NO MODEL.
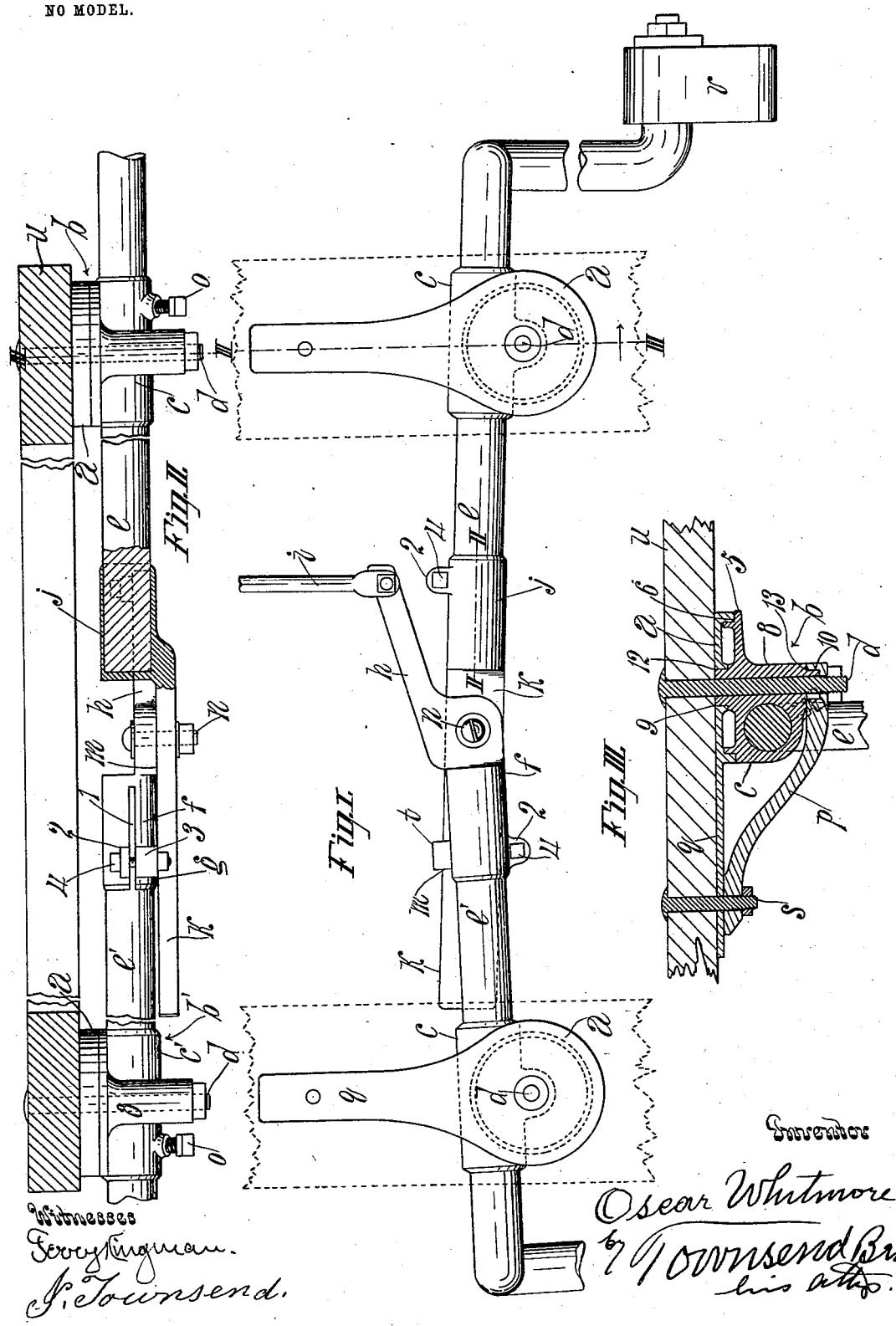

No. 727,045. Patented May 5, 1903.

UNITED STATES PATENT OFFICE.

OSCAR WHITMORE, OF SAN DIEGO, CALIFORNIA.

BRAKE-FITTING.

SPECIFICATION forming part of Letters Patent No. 727,045, dated May 5, 1903.

Application filed August 27, 1900. Renewed September 8, 1902. Serial No. 122,631. (No model.)

*To all whom it may concern:*

Be it known that I, OSCAR WHITMORE, a citizen of the United States, residing at San Diego, in the county of San Diego and State of California, have invented a new and useful Brake-Fitting, of which the following is a specification.

The object of my invention is to provide a brake-fitting of extreme simplicity and great strength of parts with a given weight and which affords superior ease of adjustment.

By means of my invention the brake-blocks can with great ease be quickly brought to exact position in line with the wheels and there fastened and can be readily adjusted to any desired position or removed whenever desired.

The accompanying drawings illustrate my invention.

Figure I is a plan of my invention adapted to be fastened to the under side of the bed or body of a vehicle. Dotted lines indicate timbers of said bed or body to form a support for the brake-shafts. The brake-shafts are shown condensed endwise to contract the view and the parts are in position for applying the brake. Fig. II is a rear elevation, partly in section on line II II, Fig. I, showing the fitting fastened to a vehicle-bed, a fragment of which is shown. Parts are broken away to contract the view. Fig. III is a fragmental section on line III III, Figs. I and II.

$a$ indicates a pivot-plate for attachment to the vehicle. Two of these plates are provided for each fitting. $b\,b'$ indicate two pivot-blocks fitted to said pivot-plates, respectively. Each of the pivot-blocks is provided with a sleeve at right angles to its pivot-axis. Said sleeves are respectively marked $c$ and $c'$.

$d$ indicates a pivot pivoting the pivot-block to the pivot-plate.

$e\,e'$ indicate two brake-shafts respectively fitted in and adjustably fastened in the sleeves $c\,c'$ of the pivot-blocks.

$f$ indicates a joint member adjustably fastened on the inner end of one of the shafts $e$ and provided with a bearing-face $g$ and with an arm $h$, to which is attached the connecting-rod $i$, which extends forward and is connected with suitable means (not shown) for operating the brake. $j$ indicates another joint member adjustably fastened on the inner end of the shaft $e'$ and provided with an arm $k$ and with a bearing-face $m$.

$n$ indicates a pivot, pivoting the arms $h$ and $k$ together, with their bearing-faces $g\,m$ in contact with each other.

Each of the joint members $f$ and $j$ comprises a socket-piece furnished on one side with a slot 1 and with lugs 2 3, projecting from the opposite sides of the slot and perforated to receive a clamping-bolt 4 to draw the walls of the socket toward each other to firmly clamp the brake-shaft in said socket. Suitable means are provided for fastening the brake-shafts in their respective sleeves.

$o$ indicates set-screws in the sleeves $c\,c'$ to clamp the shafts $e\,e'$ to their respective sleeves.

For special strength and lightness each pivot-block is formed of a plate 5, provided with a circular bearing 6, the pivot-hub 8 extending coaxially of the plate 5 and the sleeve $c$ extending beneath the plate at right angles to the barrel.

$p$ indicates a brace fastened to the hub 8 by the bolt $d$ and extending to connect with an arm $q$, which projects from the pivot-plate $a$.

$s$ indicates a bolt for fastening the brace $p$ to the arm $q$.

$t$ indicates a lug which projects laterally from the joint member $f$ to rest upon the arm $k$ of the joint member $j$ to give stability to the joint as the parts thereof move upon each other.

In practice the pivot-plates are applied to the wagon-bed $u$ or other suitable support, and the blocks $b\,b'$ are then fastened in place by the brace $p$ and the bolt $d$, as clearly shown in Fig. III. Then the brake-shafts $e\,e'$ are passed through the sleeves $c\,c'$, respectively, and the joint members $f$ and $j$ are placed upon the ends of the shafts, respectively, and are fastened by tightening the bolt 4. The pivot-bolt $n$ is applied and the connecting-rod $i$ fastened to the arm $h$. The set-screws $o\,o'$ are tightened when the brakes are in the appropriate position. To adjust the brake-block $v$, the set-screw $o$ and the bolt 4 will be loosened, thus allowing the shaft $e$ to be rotated and also to be moved endwise as desired. By tightening the screw and bolt the shaft is again tightly fastened in position.

The hub 8 terminates in journals 9 10, and the plate 5 and brace *p* are provided with bearings 12 and 13, respectively, for said journals, thus to strengthen the connection of the pivot-block with its support.

What I claim, and desire to secure by Letters Patent of the United States, is—

1. In a brake-fitting, the combination of two pivot-plates for attachment to a vehicle; two pivot-blocks, fitted to said pivot-plates, respectively, and each provided with a sleeve at right angles to its pivot-axis; pivots respectively pivoting the pivot-blocks to the pivot-plates; two brake-shafts adjustably fastened in the sleeves of the pivot-blocks, respectively; a joint member adjustably fastened on the inner end of one of the shafts, and provided with an arm and a bearing-face; another joint member adjustably fastened on the inner end of the other of the shafts, and provided with an arm and with a bearing-face; and a pivot pivoting the arms together in position, with the bearing-face of one joint member in engagement with the arm of the other joint member.

2. The combination of two brake-shafts; means for adjustably pivoting said shafts to a support; a joint member adjustably fastened on one of the brake-shafts; a joint member pivotally connected with said joint member and adjustably fastened to the other brake-shaft; and means for operating the joint to move the brake-shafts.

3. A brake-fitting comprising a pivot-plate for attachment to the vehicle; a pivot-block furnished with a bearing-face pivoted to the pivot-plate and also furnished with a sleeve having its axis at right angles to the axis of the pivot of the block; a brake-shaft in the sleeve; and means for fastening the brake-shaft in the sleeve.

4. In a brake-fitting a pivot-block comprising a bearing-plate; a pivot-hub extending at right angles to the plane of the plate; and a sleeve extending at right angles to the axis of said hub.

5. In a brake-fitting, the combination of two brake-shafts pivoted together; an arm for one of the brake-shafts for connection with the connecting-rod; two pivot-blocks, one for each of the brake-shafts; means for pivoting the blocks, respectively, to the vehicle; and means for slidably connecting the brake-shafts with said blocks, respectively.

6. In a brake-fitting, the combination of a pivot-plate furnished with an extension; a block pivoted to said plate and furnished with a sleeve at right angles to the pivot; a brace fastened at one end to the said extension of the pivot-plate; the pivot of the block passing through the plate, the block and the end of the brace, and fastened by a nut.

7. In a brake-fitting, the combination of a pivot-plate furnished with a journal-bearing and with a side extension; a pivot-block comprising a plate fitting the pivot-plate; a hub extending coaxially of said plates and furnished with a journal extension fitting the journal-bearing of the pivot-plate, said hub being also furnished at its lower end with a hub extension; a brace fitting the extension of the pivot-plate and furnished with a journal-bearing for the lower extension of the hub; a support for the pivot-plate; a bolt securing the brace, the side extension and the support together; and a bolt passing through and securing together the brace, the hub, the pivot-plate and the support.

In testimony whereof I have signed my name to this specification, in the presence of two witnesses, at San Diego, California, this 20th day of August, 1900.

OSCAR WHITMORE.

Witnesses:
W. H. PRINGLE,
VICTOR E. SHAW.